US012795755B2

(12) United States Patent
Dong

(10) Patent No.: US 12,795,755 B2
(45) Date of Patent: Nov. 10, 2026

(54) COMMUNICATION METHOD AND COMMUNICATION APPARATUS

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 326 days.

(21) Appl. No.: 18/682,327

(22) PCT Filed: Aug. 9, 2021

(86) PCT No.: PCT/CN2021/111593

§ 371 (c)(1),
(2) Date: Feb. 8, 2024

(87) PCT Pub. No.: WO2023/015415

PCT Pub. Date: Feb. 16, 2023

(65) Prior Publication Data

US 2024/0349368 A1 Oct. 17, 2024

(51) Int. Cl.
*H04W 76/12* (2018.01)
*H04W 76/11* (2018.01)
*H04W 76/14* (2018.01)

(52) U.S. Cl.
CPC ............ *H04W 76/12* (2018.02); *H04W 76/11* (2018.02); *H04W 76/14* (2018.02)

(58) Field of Classification Search
None
See application file for complete search history.

(56) References Cited

U.S. PATENT DOCUMENTS

2018/0035292 A1* 2/2018 Soundararajan ...... H04L 67/303
2021/0168115 A1* 6/2021 de la Oliva ........... H04W 12/06
2021/0211871 A1 7/2021 Chu et al.

FOREIGN PATENT DOCUMENTS

CN 102907125 A 1/2013
CN 112911728 A 6/2021
CN 112911729 A 6/2021
CN 116711449 A 9/2023
WO WO 2014152853 A2 9/2014
WO WO 2021011476 A1 1/2021
WO WO-2022124979 A1 * 6/2022 ............ H04W 76/14

OTHER PUBLICATIONS

Chinese Patent Application No. 2021800023209 Office Action dated Apr. 1, 2025, with English translation 19 pages.
PCT/CN2021/111593, International Search Report dated Apr. 27, 2022, 2 pages.
Patil, A (Qualcomm Inc.) "CC34 resolution for CIDs related to TDLS handling" doc.: IEEE 802.11-21/00240r5, Mar. 2021, 10 pages.
European Patent Application No. 21953053.2, Search Report and Opinion dated Aug. 21, 2024, 10 pages.

* cited by examiner

*Primary Examiner* — Anh Vu H Ly
(74) *Attorney, Agent, or Firm* — Cozen O'Connor

(57) ABSTRACT

The communication method may include: determining an access network query protocol (ANQP) request frame in one of multi-links, in which the ANQP request frame includes first TDLS capability information of an initiator to implement a TDLS function in the multi-links; and sending the ANQP request frame.

13 Claims, 2 Drawing Sheets

COMMUNICATION METHOD AND COMMUNICATION APPARATUS

CROSS-REFERENCE TO RELATED APPLICATIONS

The present application is a US national phase entry under 35 USC § 371 of International Application PCT/CN2021/111593, filed Aug. 9, 2021, the entire content of which is incorporated herein by reference.

FIELD

The present disclosure relates to the field of wireless communications, and particularly to a communication method and a communication device with multi-links.

BACKGROUND

The current Wi-Fi technology is studied in the following areas: a bandwidth transmission of 320 MHz, aggregation and coordination of multiple frequency bands, etc., which are expected to improve rate and throughput by at least four times compared with existing standards, and main application scenarios thereof are video transmission, augmented reality (AR), virtual reality (VR), etc.

The aggregation and coordination of the multiple frequency bands refer to that devices communicate at 2.4 GHz, 5 GHz, 6 GHz and other frequency bands at the same time, and regarding a scenario that the devices communicate at the multiple frequency bands at the same time, a new media access control (MAC) mechanism needs to be defined for management. Moreover, the aggregation and coordination of the multiple frequency bands are expected to support a low-latency transmission.

Currently, in the aggregation and coordination of the multiple frequency bands technology, a maximum bandwidth to be supported is 320 MHz (160 MHz+160 MHz), and 240 MHz (160 MHz+80 MHz) and other bandwidths may also be supported.

In current technology, a station (STA) and an access point (AP) may be a multi-link device (MLD), which supports a function capable of sending and/or receiving with multi-links.

SUMMARY

Aspects of the present disclosure will address at least the above problems and/or disadvantages. Embodiments of the present disclosure provide the following technical solutions.

In a first aspect, embodiments of the present disclosure provides a communication method, applied to an initiator of tunneled direct link setup (TDLS) and including: determining an access network query protocol (ANQP) request frame in one of multi-links, in which the ANQP request frame includes: first TDLS capability information of the initiator to implement a TDLS function in the multi-links; and sending the ANQP request frame.

In a second aspect, embodiments of the present disclosure provides a communication method, applied to a responder of tunneled direct link setup (TDLS) and including: receiving an access network query protocol (ANQP) request frame in one of multi-links, in which the ANQP request frame includes: first TDLS capability information of an initiator in communication with the responder to implement a TDLS function in the multi-links; and performing a communication operation based on the ANQP request frame.

In a third aspect, embodiments of the present disclosure provides an electronic device. The electronic device includes a memory, a processor and a computer program stored in the memory and executable on the processor, and the computer program, when executed by the processor, implements the method as described above in the first aspect.

In a fourth aspect, embodiments of the present disclosure provides an electronic device. The electronic device includes a memory, a processor and a computer program stored in the memory and executable on the processor, and the computer program, when executed by the processor, implements the method as described above in the second aspect.

BRIEF DESCRIPTION OF THE DRAWINGS

The above and other features will become more apparent by describing detailed illustrative embodiments with reference to the accompanying drawings, in which.

DETAILED DESCRIPTION

The following description with reference to the drawings is provided to facilitate a thorough understanding of embodiments of the present disclosure as defined by the appended claims and their equivalents. Embodiments of the present disclosure include various specific details, which are, however, to be considered exemplary only. Moreover, descriptions of common techniques, functions, and constructions may be omitted for clarity and conciseness.

The terms and words used in the present disclosure are not limited to written meanings, but are used only by the inventors to enable a clear and consistent understanding of the present disclosure. Accordingly, to those skilled in the art, the description of embodiments of the present disclosure is provided for the purpose of illustration only and not for the purpose of limitation.

It is understood that, as used herein, "a/an", "one", "said", and "the" in singular forms mean including plural forms, unless clearly indicated in the context otherwise. It will be further understood that the terms "comprising", as used herein, specify the presence of stated features, integers, steps, operations, elements, and/or components, but do not preclude the presence or addition of one or more other features, integers, steps, operations, elements, components, and/or groups thereof.

It is understood that, although terms such as "first", "second", etc. may be used herein for describing various elements, these elements should not be limited by these terms. These terms are only used for distinguishing one element from another element. Therefore, a first element discussed below could be termed a second element without departing from the teachings of illustrative embodiments.

It is understood that when an element is referred to as being "connected" or "coupled" to another element, it may be directly connected or coupled to the other element or intervening elements may also be present. Further, "connected" or "coupled" as used herein may include wirelessly connected or wirelessly coupled. As used herein, the term "and/or" or the expression "at least one/at least one of . . . " includes any one and all possible combinations of one or more associated listed items.

Unless defined otherwise, all terms (including technical and scientific terms) used herein have the same meaning as commonly understood by those skilled in the art to which the present disclosure belongs.

Figure 1:
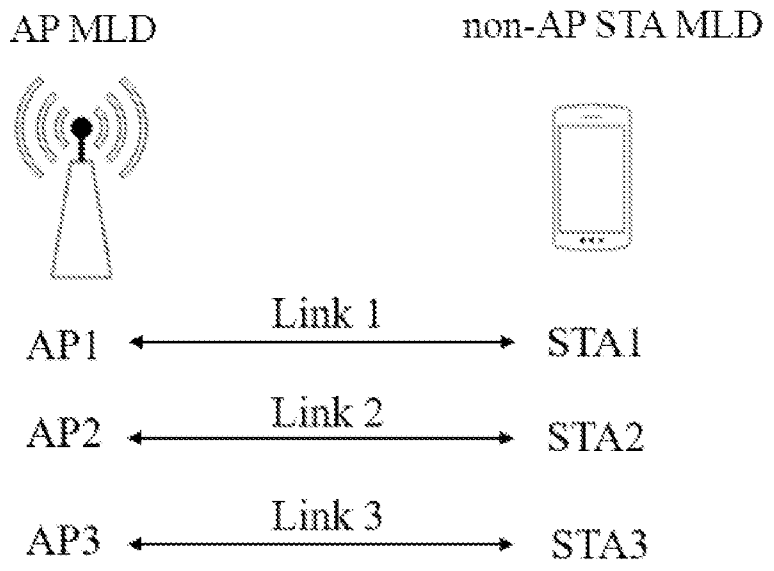
FIG. 1 is a schematic diagram illustrating a communication scenario with multi-links according to embodiments.

FIG. 1 is a schematic diagram illustrating a communication scenario with multi-links according to embodiments.

In a wireless local area network, a basic service set (BSS) may be composed of an access point (AP) and one or more stations (STAs) that communicate with the AP. A basic service set may be linked to a distribution system (DS) through the AP thereof and then linked to another basic service set to form an extended service set (ESS).

The AP is a wireless switch for a wireless network and is also an access device for the wireless network. The AP device may be used as a wireless base station, primarily a bridge for connecting the wireless network to a wired network. With such AP, both wired and wireless networks may be integrated.

The AP may include software applications and/or circuit to enable other types of nodes in the wireless network to communicate with outside and inside the wireless network via the AP. In some examples, the AP may be a terminal device or a network device equipped with a wireless fidelity (Wi-Fi) chip, as an example.

By way of example, the STA may include, but is not limited to: a cellular phone, a smart phone, a wearable device, a computer, a personal digital assistant (PDA), a personal communication system (PCS) device, a personal information manager (PIM), a personal navigation device (PND), a global positioning system, a multimedia device, an internet of things (IoT) device, etc.

In illustrative embodiments of the present disclosure, the AP and the STA may be devices supporting multi-links, and may be represented as for example an AP MLD and a non-AP MLD, respectively. For convenience of description, hereinafter, an example in which one AP communicates with one STA in multi-links is mainly described. However, illustrative embodiments of the present disclosure are not limited thereto.

In FIG. 1, by way of example only, the AP MLD may represent an access point supporting a multi-link communication function, and the non-AP MLD may represent a station supporting the multi-link communication function. With reference to FIG. 1, the AP MLD may operate with three links, such as an AP1, an AP2 and an AP3 shown in FIG. 1; the non-AP MLD may also operate with three links, such as an STA1, an STA2 and an STA3 as shown in FIG. 1. In the example of FIG. 1, it is assumed that the AP1 communicates with the STA1 via a first link 1, similarly, the AP2 and the AP3 communicate with the STA2 and the STA3 via a second link 2 and a third link 3, respectively. Furthermore, the link 1 to link 3 may be multiple links at different frequencies, e.g. links at 2.4 GHz, 5 GHz, and 6 GHz, respectively, or may be multiple links with the same or different bandwidths at 2.4 GHz, 5 GHz, and 6 GHz. Furthermore, there are a plurality of channels with each link. It will be understood that the communication scenario shown in FIG. 1 is illustrative as an example, and the concept of the present disclosure is not limited thereto. For example, the AP MLD may be connected to a plurality of non-AP MLDs, or the AP may communicate with a plurality of other types of stations with each link.

Figure 2:
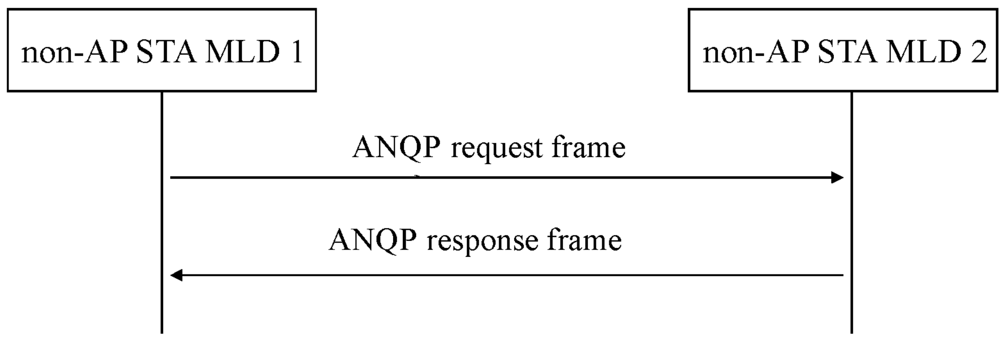
FIG. 2 is a schematic diagram illustrating tunneled direct link setup (TDLS) according to embodiments.

To improve transmission efficiency, the non-AP STA MLD may support a tunneled direct link setup (TDLS) function. FIG. 2 is a schematic diagram illustrating tunneled direct link setup (TDLS) according to embodiments.

Referring to FIG. 2, the TDLS may be implemented between a first multi-link site device non-AP STA MLD 1 and a second multi-link site device non-AP STA MLD 2, so that communication (e.g. transmission of data) may be directly conducted therebetween without passing through the AP MLD.

In embodiments of the present disclosure, for a site discovery TDLS function, an access network query protocol (ANQP) mechanism may be employed, for example and without limitation. For example, referring to FIG. 2, a first site device non-AP STA 1 attached to one multi-link device non-AP STA MLD 1 may be used as an initiator to send an ANQP request frame to a second site device non-AP STA 2 attached to another multi-link device non-AP STA MLD 2, and the second site device non-AP STA 2 may be used as a responder to return an ANQP response frame to the first site device non-AP STA 1. Then, a tunneled direct link is established between them via a process of establishment of the TDLS. For example, the process of establishment of the TDLS may include: a TDLS setup request, a TDLS setup response and a TDLS setup confirm.

In the prior art, stations operating in the same BSS may establish the TDLS, and a station adapted for a single link establishes the TDLS. However, in multi-link communication, a station attached to the same non-AP STA MLD establishes an initial association with an AP attached to the same AP MLD, and different APs have different BSSs. In case that the TDLS is to be established between stations (for example, the multi-link station device non-AP STA MLD 1, and the multi-link station device non-AP STA MLD 2) supporting multi-link communication as shown in FIG. 2, mechanisms in the prior art may not satisfy multi-link requirements, and therefore the existing mechanisms need to be enhanced.

Figure 3:
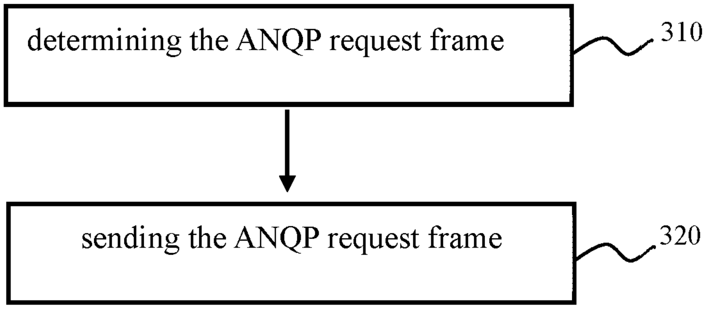
FIG. 3 is a flow chart illustrating a communication method according to embodiments.

FIG. 3 is a flow chart illustrating a communication method according to embodiments. The communication method shown in FIG. 3 may be applied to an initiator of the TDLS. According to embodiments of the present disclosure, the initiator may be MLD-level, i.e. a station that supports multi-link communication (e.g. the non-AP STA MLD 1 shown in FIG. 2).

Referring to FIG. 3, in step 310, the ANQP request frame is determined in one of multi-links. According to embodiments of the present disclosure, the ANQP request frame may include: first TDLS capability information of the initiator to implement a TDLS function in the multi-links.

In embodiments of the present disclosure, the multi-links may refer to a plurality of links supported for communication as an MLD-level initiator. The ANQP request frame according to embodiments of the present disclosure may identify the TDLS function in the multi-links under one link, that is, the first TDLS capability information is the MLD-level.

In embodiments of the present disclosure, there may be many ways to determine a first message frame. For example, the first message frame may be generated according to at least one of the following conditions: network situations, load situations, hardware capabilities of a sending/receiving device, a service type and relevant protocol provisions, and embodiments of the present disclosure are not particularly limited thereto. In embodiments of the present disclosure, the first message frame may also be obtained from an external device, and embodiments of the present disclosure is not particularly limited thereto.

According to embodiments of the present disclosure, the first TDLS capability information includes at least one of:

- a first information identifier configured to identify a support capability of the initiator for the TDLS function;
- a first address identifier configured to identify a media access control (MAC) address of an access point multi-link device (AP MLD) that establishes an associated link with the initiator;
- a first basic service set identifier configured to identify the basic service set identifier corresponding to an AP MLD that establishes an associated link with the initiator with each link;
- a second address identifier configured to identify the initiator as a station for supporting multiple links;
- a first link identifier configured to identify a link for establishing the TDLS; or
- a first link address identifier configured to identify an MAC address of a link for establishing the TDLS.

According to embodiments of the present disclosure, the first TDLS capability information may be encapsulated/carried in the ANQP request frame by means of a capability information element. For example, but not limited to, the ANQP request frame includes a TDLS capability ANQP-element, and the first TDLS capability information may be included in the TDLS capability ANQP-element. The TDLS capability ANQP-element may have a format as shown in Table 1 below.

TABLE 1

| TDLS capability ANQP-element | | |
|---|---|---|
| Info ID | Length | Peer Information |

The "Info ID" in Table 1 may be taken as an example of the first information identifier in the first TDLS capability information. In case that the information identifier (the first information identifier) is set to a specific value, TDLS capability may be identified, i.e. the information element is identified as the TDLS capability ANQP-element. In other words, supporting capability of the initiator for the TDLS function may be identified by setting the information identifier (the first information identifier) to a specific value.

The "Length" in Table 1 may identify a length field of length information of the TDLS capability ANQP-element.

The "Peer information" in Table 1 may include information that is capable of being used for the initiator to establish the TDLS link. For example, the peer information may include elements shown in Table 2 below.

TABLE 2

| Peer Information | | |
|---|---|---|
| AP MLD MAC address | non-AP MLD MAC address (initiator) | Link set/Link ID1 to Link ID m |

Referring to Table 2, the AP MLD MAC address may be taken as an example of the above-mentioned first address identifier, which may be configured to identify that the initiator establishes an associated link with the AP MLD corresponding to the AP MLD MAC address in case that the AP MLD MAC address is included in the peer information.

The "non-AP MLD MAC address" in Table 2 may be taken as an example of the above-mentioned second address identifier, which is configured to identify the initiator as a station for supporting the multi-links. In one embodiment of the present disclosure, the non-AP MLD MAC address of the initiator may be MLD-level, i.e. one non-AP MLD MAC address (second address identifier) may identify the multi-link device MAC address of the initiator. In another embodiment of the present disclosure, the non-AP MLD MAC address of the initiator may be link-level, i.e. the second address identifier may include an MAC address of each attached site of the initiator with each link.

The "Link set/Link ID1 to Link ID m" in Table 2 may be taken as an example of the above-mentioned first link identifier for identifying a link for establishing the TDLS. For example, the first link identifier may be in a form of a link set, which may include a plurality of bits (e.g. but not limited to, two bytes). Each bit corresponds to a link, in case that the corresponding bit is set to a specific value (e.g. but not limited to, "1"), the first link identifier may identify that the TDLS is established with the link. For example, the first link identifier may be in a form of a link ID (link identifier), which may have a plurality of bits to identify combined information about an operating spectrum, a bandwidth/channel, and/or a basic service set identifier (BSSID), etc. The m may identify a number of the links to establish the TDLS, and m may be an integer greater than or equal to 1. For example, in case that the TDLS needs to be established with m links, then alternative, Table 2 may include Link ID1 to Link ID m, and each link ID may identify the combined information about the operating spectrum, the bandwidth/channel, and/or BSSID, etc. of the corresponding TDLS link.

The first link identifier is represented in the form of the link set, so that information carried in the ANQP request frame may be simplified, and power consumption and occupied resources in communication are reduced. The first link identifier is represented in the form of the link ID, so that each link for which the TDLS needs to be established may be more clearly identified.

It will be understood that the peer information in the ANQP request frame shown in Table 2 is merely illustrative and the present disclosure is not limited thereto. For example, Table 2 may be modified as shown in Table 3 below.

TABLE 3

| Variation of peer information | | |
|---|---|---|
| BSSID 1 to BSSID n | non-AP MLD MAC address (initiator) | Link MAC address 1 to Link MAC address m |

Referring to Table 3, "BSSID 1 to BSSID n" may be taken as an example of the above-mentioned first BSSID. BSSID 1 to BSSID n may respectively identify a basic service set identifier corresponding to the AP MLD establishing the associated link with the initiator with each link. The n may represent a number of the associated links established between the initiator and the AP MLD, and n may be an integer greater than or equal to 2. For example, referring to the examples of FIG. 1 and FIG. 2, in case that the non-AP STA MLD 1 as the initiator establishes an associated link with the AP MLD under three links (Link1 to Link3), Table 3 may include BSSID 1 to BSSID 3, and BSSID 1 to BSSID 3 identify a basic service set identifier of AP1 to AP3, respectively.

The "non-AP MLD MAC address" in Table 3 may be the same as the embodiment of Table 2, and repeated description is omitted herein for the sake of brevity.

The "Link MAC address 1 to Link MAC address m" in Table 3 may be taken as an example of the above-mentioned first link address identifier for identifying the MAC address of the link for establishing the TDLS. For example, referring to the examples of FIGS. 1 and 2, in case that the initiator (non-AP STA MLD 1) needs to establish the TDLS with a first link (Link 1) and a third link (Link 3) in the multi-links, alternatively, Table 3 may include an MAC address of the STA1 and an MAC address of the STA3.

In other embodiments of the present disclosure, Tables 2 and 3 may also be modified to the forms shown in Tables 4 and 5 below.

TABLE 4

| Variation of peer information | | |
|---|---|---|
| AP MLD MAC address | non-AP MLD MAC address (initiator) | Link MAC address 1 to Link MAC address m |

TABLE 5

| Variation of peer information | | |
|---|---|---|
| BSSID 1 to BSSID n | non-AP MLD MAC address (initiator) | Link set/Link ID1 to Link ID m |

It will be understood that inclusion of the peer information in Tables 2 to 5 is merely illustrative, and the present disclosure is not limited thereto. Other elements for the TDLS communication or the multi-link communication may also be included in Tables 2 to 5, or some elements may be omitted in Tables 2 to 5. For example, the first TDLS capability information in the ANQP request frame may include one of the following combinations: TDLS capability+MLD MAC address (AP MLD)+MAC address with each link; TDLS capability+MLD MAC address (AP MLD)+Link ID+MAC address with each link; TDLS capability+BSSID (AP with different links)+Link ID+MAC address with each link; TDLS capability+BSSID (AP with different links)+MAC address with each link. However, the above combinations are merely illustrative and embodiments of the present disclosure are not limited thereto.

In addition, it may be understood that each of the elements shown in Tables 2 to 5 are independently present, and that the elements are illustratively listed in the same table, but do not represent that all of the elements in the table must be present at the same time as indicated in the tables. It will thus be understood by those skilled in the art that a value of each of the elements in the tables of the present disclosure is an independent embodiment.

In addition, although it is shown in Tables 2 to 5 that one of the first address identifier (AP MLD MAC address) and the first basic service set identifier (BSSID 1 to BSSID n) is carried in the peer information, and one of the first link identifier (Link set/Link ID1 to Link ID m) and the first link address identifier (Link MAC address 1 to Link MAC address m) is carried in the peer information, it is not limited thereto. For example, the first address identifier (AP MLD MAC address) and the first basic service set identifier (BSSID 1 to BSSID n) may be simultaneously carried in the ANQP request frame, and the first link identifier (Link set/Link ID1 to Link ID m) and the first link address identifier (Link MAC address 1 to Link MAC address m) may be simultaneously carried in the ANQP request frame.

In embodiments of the present disclosure, it is provided that information about the AP MLD establishing the associated link with the initiator and information about the link establishing the TDLS are carried in the ANQP request frame in different ways, so that flexibility of a system may be increased.

According to embodiments of the present disclosure, capability in the ANQP request frame is set to the TDLS; the ANQP request frame may include a value of the AP MLD MAC address, which identifies that the ANQP request frame establishes an association with the AP MLD identified by the AP MLD MAC address; the ANQP request frame may include the non-AP STA MLD MAC address, which identifies the station as the station supporting the multi-links. Alternatively, the ANQP request frame may include: a link set, which may be two bytes. In case that the corresponding bit is set to "1", the ANQP request frame identifies that it establishes the TDLS with this link, and alternatively may include the MAC address with this link.

Although the first TDLS capability information carried in the ANQP request frame is described with reference to the TDLS capability ANQP information element and the information identifier and the peer information included therein, the present disclosure is not limited thereto and the first TDLS capability information may be carried by other means, such as different information elements or other encapsulation means.

With continued reference to FIG. 3, in step 320, the ANQP request frame may be sent. The ANQP request frame may be sent in any of the multi-links. For example, the link sending the ANQP request frame may be the same as or different from the link configured to determine the ANQP request frame in step 310, for which the present disclosure is not particularly limited.

The communication method shown in FIG. 3 is merely illustrative, and the present disclosure is not limited thereto. For example, as shown in FIG. 2, the communication method shown in FIG. 3 may further include: receiving the ANQP response frame. The ANQP response frame may include: second TDLS capability information configured to indicate the responder in communication with the initiator to implement the TDLS function with the multi-links.

According to embodiments of the present disclosure, the responder may be the MLD-level, i.e. a station that supports the multi-link communication (e.g. the non-AP STA MLD 2 as shown in FIG. 2 in communication with the non-AP STA MLD 1 as the initiator).

According to embodiments of the present disclosure, the second TDLS capability information includes at least one of:

- a second information identifier configured to identify a support capability of the responder for the TDLS function;
- a third address identifier configured to identify the MAC address of the access point multi-link device that establishes the associated link with the responder;
- a second basic service set identifier configured to identify the basic service set identifier corresponding to the access point multi-link device that establishes the associated link with the responder with each link;
- a fourth address identifier configured to identify the MAC address of the multi-link device of the responder;
- a second link identifier configured to identify the link for establishing the TDLS; or
- a second link address identifier configured to identify the MAC address of the link for establishing the TDLS.

According to embodiments of the present disclosure, the second TDLS capability information may be encapsulated/carried in the ANQP request frame by means of the capability information element. For example, but not limited to, the ANQP request frame includes the TDLS capability ANQP-element, and the second TDLS capability information may be included in the TDLS capability ANQP-element. The TDLS capability ANQP-element may have the format as shown in Table 1 above.

By way of example only, the ANQP response frame received may be an update to the TDLS capability ANQP-element in the ANQP request frame.

For example, in the ANQP response frame, the Info ID in Table 1 may be an example of the above-mentioned second information identifier, and the meaning thereof is similar to the example of the first information identifier in the ANQP request frame, and repeated description is omitted herein for brevity.

For example, in the ANQP response frame, the peer information in Table 1 may include information about the responder establishing the TDLS link. In the ANQP response frame, the peer information may include the elements shown in Table 6 below.

TABLE 6

| Peer Information | | |
|---|---|---|
| AP MLD MAC address | non-AP MLD MAC address (responder) | Link set/Link ID1 to Link ID t |

Referring to Table 6, the "AP MLD MAC address" in Table 6 may be taken as an example of the above-mentioned third address identifier for identifying the MAC address of the AP MLD that establishes the associated link with the responder.

According to embodiments of the present disclosure, the third address identifier is the same as the first address identifier. That is, the AP MLD MAC address in Table 6 is the same as the AP MLD MAC address in Table 2, that is, both the initiator and the responder have established the associated link with the same AP MLD. In this case, the TDLS link may be established between the initiator and the responder. For example, referring to FIG. 1 and FIG. 2, similar to the example of FIG. 3, the non-AP STA MLD 2 and the AP MLD as responders may establish associated links with three links (Link1 to Link3), so that Table 6 may have the same AP MLD MAC address as Table 2.

Referring to Table 6, the "non-AP MLD MAC address" may be taken as an example of the above-mentioned fourth address identifier for identifying the MAC address of the multi-link device of the responder. In one embodiment of the present disclosure, the non-AP MLD MAC address as the responder may be the MLD-level, i.e. one non-AP MLD MAC address (the fourth address identifier) may identify the MLD MAC address of the responder, and the non-AP MLD MAC address may be configured to negotiate a session key in subsequent communication operations between the two. In another embodiment of the present disclosure, the non-AP MLD MAC address may be the link-level, i.e. the fourth address identifier may include the MAC address of the responder for each attached station with each link.

The "Link set/Link ID1 to Link ID t" in Table 6 may be taken as an example of the above-mentioned second link identifier for identifying the link for establishing the TDLS. The meaning of "Link set/Link ID1 to Link ID t" in Table 6 may be similar to the meaning of "Link set/Link ID1 to Link ID n" in Table 2, except that the link and the number for establishing the TDLS may be different, which will be described below.

It will be understood that the peer information in the ANQP request frame shown in Table 6 is merely illustrative and the present disclosure is not limited thereto. For example, Table 6 may be modified as shown in Table 7 below.

TABLE 7

| Variation of peer information | | |
|---|---|---|
| BSSID 1 to BSSID n | non-AP MLD MAC address (responder) | Link MAC address 1 to Link MAC address t |

Referring to Table 7, "BSSID 1 to BSSID n" may be taken as an example of the above-mentioned second BSSID. BSSID 1 to BSSID n may respectively identify the basic service set identifier corresponding to the AP MLD establishing the associated link with the responder with each link.

According to embodiments of the present disclosure, the second BSSID is the same as the first BSSID. That is, BSSID 1 to BSSID n in Table 7 are the same as BSSID 1 to BSSID n in Table 3, that is, both the initiator and the responder have the associated link with the same AP MLD. In this case, the TDLS link may be established between the initiator and the responder. For example, referring to the examples of FIG. 1 and FIG. 2, similar to the example of FIG. 3, the non-AP STA MLD 2 and the AP MLD as the responders may establish the associated links with three links (Link1 to Link3), so that Table 7 may include the same BSSID 1 to BSSID 3 as Table 3, and BSSID 1 to BSSID 3 identify the basic service set identifiers of AP1 to AP3, respectively.

The "non-AP MLD MAC address" in Table 7 may be the same as the embodiment of Table 6, and repeated description is omitted herein for brevity.

The "Link MAC address 1 to Link MAC address t" in Table 7 may be taken as an example of the above-mentioned second link address identifier for identifying the MAC address of the link for establishing the TDLS. The meaning of "Link set/Link ID1 to Link ID t" in Table 7 may be similar to the meaning of "Link set/Link ID1 to Link ID m" in Table 3, except that the link and the number for establishing the TDLS may be different.

With reference to Tables 2 and 3 and Tables 6 and 7, for example, in case that the initiator receives that the second link identifier (Link set/Link ID1 to Link ID t) in the ANQP response frame is the same as the first link identifier (Link set/Link ID1 to Link ID n) in the ANQP request frame, and/or the second link address identifier (Link MAC address 1 to Link MAC address t) is the same as the first link address identifier (Link MAC address 1 to Link MAC address m), it means that the responder agrees with establishment of the TDLS link defined by the initiator in Table 2 or Table 3, and in this case, the second link identifier and/or the second link address identifier may also be omitted in the ANQP response frame, which reduces the power consumption for transmitting these pieces of information; in case that the initiator receives that the second link identifier (Link set/Link ID1 to Link ID t) in the ANQP response frame is different from the first link identifier (Link set/Link ID1 to Link ID n) in the ANQP request frame, and/or the second link address identifier (Link MAC address 1 to Link MAC address t) is different from the first link address identifier (Link MAC address 1 to Link MAC address m), it means that the responder does not agree with the establishment of the TDLS link defined by the initiator in Table 2 or Table 3, and the updated information of the TDLS link is carried in the ANQP response frame.

In other embodiments of the present disclosure, Tables 6 and 7 may also be modified to the forms shown in Tables 8 and 9 below.

TABLE 8

| Variation of peer information | | |
|---|---|---|
| AP MLD MAC address | non-AP MLD MAC address (responder) | Link MAC address 1 to Link MAC address t |

TABLE 9

| Variation of peer information | | |
|---|---|---|
| BSSID 1 to BSSID n | non-AP MLD MAC address (responder) | Link set/Link ID1 to Link ID t |

It will be understood that inclusion of the peer information in Tables 6 to 9 is merely illustrative, and the present disclosure is not limited thereto. Other elements for the TDLS communication or the multi-link communication may also be included in Tables 6 to 9, or some elements may be omitted in Tables 6 to 9. In addition, it may be understood that each of the elements shown in Tables 6 to 9 are independently present, and that the elements are illustratively listed in the same table, but do not represent that all of the elements in the table must be present at the same time as indicated in the tables. It will thus be understood by those skilled in the art that a value of each of the elements in the tables of the present disclosure is an independent embodiment.

In addition, although it is shown in Tables 2 to 5 that one of the third address identifier (the AP MLD MAC address) and the second basic service set identifier (BSSID 1 to BSSID n), and one of the second link identifier (Link set/Link ID1 to Link ID t) and the second link address identifier (Link MAC address 1 to Link MAC address t) are included in the peer information of the ANQP response frame, it is not limited thereto. For example, the third address identifier (the AP MLD MAC address) and the second basic service set identifier (BSSID 1 to BSSID n), and the second link identifier (Link set/Link ID1 to Link ID t) and the second link address identifier (Link MAC address 1 to Link MAC address t) may be simultaneously carried in the ANQP request frame. For example, the content of the peer information carried in the ANQP response frame may be determined from the content or other forms of the peer information carried in the ANQP request frame as shown in one of Tables 2 to 5.

According to embodiments of the present disclosure, the capability in the ANQP response frame is set to the TDLS; the ANQP response frame may include the value of the AP MLD address, which identifies that the value of the AP MLD address establishes an association with the same AP MLD in the ANQP request frame; the ANQP response frame may include the non-AP STA MLD MAC address (used to negotiate the session key) of the responder. Alternatively, the ANQP request frame may include: a link set, which may be, for example, two bytes, and identifies that it establishes the TDLS with this link in case that the corresponding bit is set to "1", and alternatively may include the MAC address with this link.

Although the second TDLS capability information carried in the ANQP request frame is described with reference to the TDLS capability ANQP information element and the information identifier and the peer information included therein, the present disclosure is not limited thereto and the second TDLS capability information may be carried by other means, such as different information elements or other encapsulation means.

Figure 4:
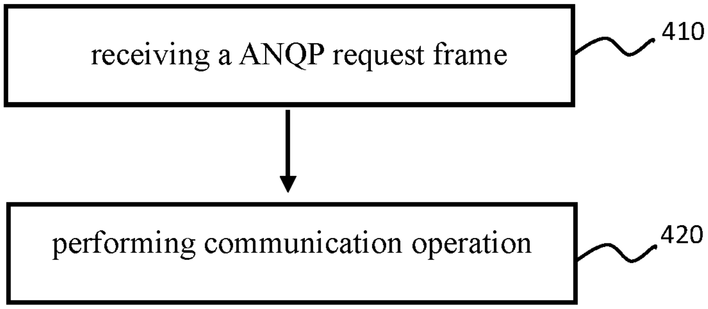
FIG. 4 is a flow chart illustrating a communication method according to embodiments.

FIG. 4 is a flow chart illustrating a communication method according to embodiments. The communication method shown in FIG. 4 may be applied to the responder of the TDLS. According to embodiments of the present disclosure, the responder may communicate with the initiator, and the responder may be the MLD-level, i.e. the station that supports multi-link communication (e.g. the non-AP STA MLD 1 shown in FIG. 2).

Referring to FIG. 4, in step 410, the ANQP request frame is determined in one of the multi-links. According to embodiments of the present disclosure, the ANQP request frame is received in one of the multi-links. The ANQP request frame includes: the first TDLS capability information of the initiator in communication with the responder to implement the TDLS function with the multiple links. The multi-links may be the plurality of links supported by the responder for the communication.

Examples of the ANQP request frame and the first TDLS capability information may be similar to those described above with reference to FIG. 3 and Tables 1 to 5, and repeated descriptions are omitted herein in order to avoid redundancy.

In step 410, a communication operation is performed based on the ANQP request frame. For example, the ANQP response frame may be determined based on the ANQP request frame (e.g. determining the second TDLS capability information) to facilitate establishing the TDLS with multiple links.

As described in conjunction with FIG. 2, the communication method shown in FIG. 4 may further include: sending the ANQP response frame. The ANQP response frame includes: the second TDLS capability information configured to indicate the responder to implement the TDLS function in the multi-links. In embodiments of the present disclosure, the ANQP response frame may be sent in any of the multi-links, and the link for sending the ANQP response frame and the link for receiving the ANQP request frame may be the same or different. Embodiments of the ANQP response frame and the second TDLS capability information may be similar to those described above with reference to FIG. 3 and Tables 1 and 6 to 9, and repeated descriptions are omitted herein for brevity.

The communication method according to embodiments of the present disclosure may discover the TDLS in multi-links under one link, i.e. the TLDS capability is the MLD level, so that the ANQP TDLS discovery protocol may be applied to the multi-link device.

Figure 5:
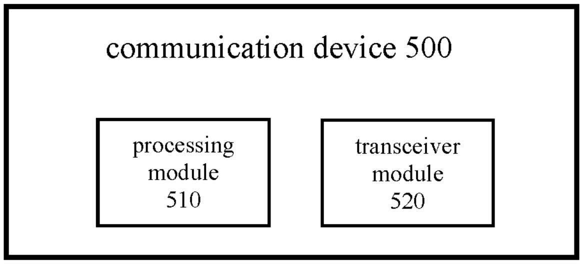
FIG. 5 is a block diagram illustrating a communication apparatus according to embodiments.

FIG. 5 is a block diagram illustrating a communication apparatus according to embodiments.

Referring to FIG. 5, the communication apparatus 500 may include a processing module 510 and a transceiver module 520.

In one embodiment of the present disclosure, the communication apparatus shown in FIG. 5 may be applied to a TDLS initiator (MLD-level). In this case, the processing module 510 may be configured to determine the ANQP request frame in one of the multi-links, where the ANQP request frame includes: the first TDLS capability information of the initiator to implement the TDLS function in the multi-links; and the transceiver module 520 may be configured to send the ANQP request frame. Embodiments of the ANQP request frame and the first TDLS capability information may be similar to those described above with reference to FIG. 3 and Tables 1 to 5, and repeated descriptions are omitted herein for the sake of brevity. Further, the transceiver module 520 may also be configured to receive the ANQP response frame, and the ANQP response frame includes: the second TDLS capability information configured to indicate the responder to implement the TDLS function with the multi-links. Embodiments of the ANQP response frame and the second TDLS capability information may be similar to those described above with reference to FIG. 3 and Table 1 and Tables 6 to 9, and repeated descriptions are omitted herein for the sake of brevity.

In another embodiment of the present disclosure, the communication apparatus shown in FIG. 5 may be applied to a TDLS responder (MLD level). In this case, the transceiver module 520 may be configured to receive the ANQP request frame with one of the multi-links. The ANQP request frame includes: the first TDLS capability information of the initiator in communication with the responder to implement the TDLS function with the multiple links. The processing module 510 may be further configured to perform the communication operation based on the ANQP request frame. Embodiments of the ANQP request frame and the first TDLS capability information may be similar to those described above with reference to FIG. 3 and Tables 1 to 5, and repeated descriptions are omitted herein for the sake of brevity. Further, the processing module 510 may determine the ANQP response frame, and control the transceiver module 520 to send the ANQP response frame. The ANQP response frame may include: the second TDLS capability information configured to indicate the responder to implement the TDLS function with the multiple links. Embodiments of the ANQP response frame and the second TDLS capability information may be similar to those described above with reference to FIG. 3 and Table 1 and Tables 6 to 9, and repeated descriptions are omitted herein for the sake of brevity.

Further, the communication apparatus 500 shown in FIG. 5 is merely illustrative, and embodiments of the present disclosure are not limited thereto. For example, the communication apparatus 500 may also include other modules, e.g. a memory module, etc. Further, the various modules in the communication apparatus 500 may be combined into more complex modules or may be divided into more individual modules.

Based on the same principles as the method provided by embodiments of the present disclosure, embodiments of the present disclosure further provide an electronic device including a processor and a memory. The memory stores a machine-readable instruction (which may also be referred to as a "computer program"), and the processor is configured to perform the machine-readable instruction to implement the method described with reference to FIGS. 3 and 4.

Embodiments of the present disclosure further provide a computer readable storage medium having stored therein the computer program. The computer program, when executed by the processor, implements the method described with reference to FIGS. 3 and 4.

In illustrative embodiments, the processor may be configured to implement or execute various illustrative logical blocks, modules and circuits described in conjunction with the present disclosure, such as a central processing unit (CPU), a general purpose processor, a digital signal processor (DSP), an application specific integrated circuit (ASIC), a field programmable gate array (FPGA) or other programmable logic devices, transistor logic devices, hardware components or any combination thereof. The processor may also be a combination that implements computing functions, including, for example, a combination of one or more microprocessors, a combination of the DSP and the microprocessor, etc.

In example embodiments, the memory may be, for example, a read only memory (ROM), a random access memory (RAM), an electrically erasable programmable read only memory (EEPROM), a compact disc read only memory (CD-ROM) or other optical disk storage, optical disk storage (including compact disk, laser disk, optical disk, digital versatile disk, blu-ray disk, etc.), magnetic disk storage media or other magnetic storage devices, or any other medium that may be used to carry or store program code in the form of instructions or data structures and that may be accessed by the computer, but is not limited thereto.

It should be understood that, although the various steps in the flowcharts of the figures are shown in order as indicated by the arrows, the steps are not necessarily performed in the order indicated by the arrows. Unless explicitly stated herein, there is no strict limitation on the order in which these steps are performed, and these steps may be performed in other orders. Moreover, at least some of the steps in the flowcharts of the figures may include sub-steps or stages that are not necessarily performed at the same time, but may be performed at different times, and the order of their execution may not necessarily be sequential, but may be performed in turn or in alternation with other steps or at least some of the sub-steps or stages of other steps.

While the present disclosure has been shown and described with reference to certain embodiments thereof, it will be understood by those skilled in the art that various changes in form and details may be made therein without departing from the scope of the present disclosure. Therefore, the scope of the present disclosure should not be limited to the embodiments, but should be defined by the appended claims and their equivalents

What is claimed is:

1. A communication method for a wireless fidelity (Wi-Fi), performed by an initiator of tunneled direct link setup (TDLS), comprising:

determining an access network query protocol (ANQP) request frame in one of multi-links, wherein the ANQP request frame comprises: first TDLS capability information of the initiator to implement a TDLS function in the multi-links, wherein the first TDLS capability information comprises: a first address identifier configured to identify a media access control (MAC) address of an access point multi-link device (AP MLD) that establishes an associated link with the initiator and a first basic service set identifier configured to identify a basic service set identifier corresponding to an access point multi-link device that establishes an associated link with the initiator with each link;

sending the ANQP request frame; and receiving an ANQP response frame, wherein the ANQP response frame comprises: second TDLS capability information configured to indicate a responder in communication with the initiator to implement the TDLS function with the multi-links, and the second TDLS capability information comprises: a third address identifier configured to identify an MAC address of an access point multi-link device that establishes an associated link with the responder and a second basic service set identifier configured to identify a basic service set identifier corresponding to an access point multi-link device that establishes an associated link with the responder with each link.

2. The communication method of claim 1, wherein the first TDLS capability information further comprises at least one of:

a first information identifier configured to identify a support capability of the initiator for the TDLS function;

a second address identifier configured to identify the initiator as a station for supporting the multi-links;

a first link identifier configured to identify a link for establishing the TDLS; or a first link address identifier configured to identify an MAC address of a link for establishing the TDLS.

3. The communication method of claim 1, wherein the second TDLS capability information further comprises at least one of:

a second information identifier configured to identify a support capability of the responder for the TDLS function;

a fourth address identifier configured to identify an MAC address of a multi-link device of the responder;

a second link identifier configured to identify a link for establishing the TDLS; or a second link address identifier configured to identify a MAC address of a link for establishing the TDLS.

4. The communication method of claim 1, wherein the third address identifier is same as the first address identifier.

5. A communication method for a wireless fidelity (Wi-Fi), performed by a responder of tunneled direct link setup (TDLS), comprising:

receiving an access network query protocol (ANQP) request frame in one of multi-links, wherein the ANQP request frame comprises: first TDLS capability information of an initiator in communication with the responder to implement a TDLS function in the multi-links, wherein the first TDLS capability information comprises: a first address identifier configured to identify a media access control (MAC) address of an access point multi-link device (AP MLD) that establishes an associated link with the initiator and a first basic service set identifier configured to identify a basic service set identifier corresponding to an access point multi-link device that establishes an associated link with the initiator with each link;

performing a communication operation based on the ANQP request frame; and sending an ANQP response frame, wherein the ANQP response frame comprises: second TDLS capability information configured to indicate the responder to implement the TDLS function in the multi-links, and the second TDLS capability information comprises: a third address identifier configured to identify an MAC address of an access point multi-link device that establishes an associated link with the responder and a second basic service set identifier configured to identify a basic service set identifier corresponding to an access point multi-link device that establishes an associated link with the responder with each link.

6. The communication method of claim 5, wherein the first TDLS capability information further comprises at least one of:

a first information identifier configured to identify a support capability of the initiator for the TDLS function;

a second address identifier configured to identify the initiator as a station for supporting the multi-links;

a first link identifier configured to identify a link for establishing the TDLS; or a first link address identifier configured to identify an MAC address of a link for establishing the TDLS.

7. The communication method of claim 5, wherein the second TDLS capability information further comprises at least one of:

a second information identifier configured to identify a support capability of the responder for the TDLS function;

a fourth address identifier configured to identify an MAC address of a multi-link device of the responder;

a second link identifier configured to identify a link for establishing the TDLS; or a second link address identifier configured to identify an MAC address of a link for establishing the TDLS.

8. The communication method of claim 5, wherein the third address identifier is the same as the first address identifier.

9. An electronic device comprising a memory, a processor and a computer program stored in the memory and executable on the processor, wherein the computer program that, when executed by the processor, causes the device to:

determine an access network query protocol (ANQP) request frame in one of multi-links, wherein the ANQP request frame comprises: first TDLS capability information of the electronic device to implement a TDLS function in the multi-links, wherein the first TDLS capability information comprises: a first address identifier configured to identify a media access control (MAC) address of an access point multi-link device (AP MLD) that establishes an associated link with an initiator of the TDLS and a first basic service set identifier configured to identify a basic service set identifier corresponding to an access point multi-link device that establishes an associated link with the initiator with each link;

send the ANQP request frame; and receive an ANOP response frame, wherein the ANQP response frame comprises: second TDLS capability information configured to indicate a responder in communication with the initiator to implement the TDLS function with the multi-links, and the second TDLS capability information comprises: a third address identifier configured to identify an MAC address of an access point multi-link device that establishes an associated link with the responder and a second basic service set identifier configured to identify a basic service set identifier corresponding to an access point multi-link device that establishes an associated link with the responder with each link.

10. The electronic device of claim 9, wherein the first TDLS capability information further comprises at least one of:

a first information identifier configured to identify a support capability of the electronic device for the TDLS function;

a second address identifier configured to identify the electronic device as a station for supporting the multi-links;

a first link identifier configured to identify a link for establishing the TDLS; or a first link address identifier configured to identify an MAC address of a link for establishing the TDLS.

11. The electronic device of claim 9, wherein the second TDLS capability information further comprises at least one of:

a second information identifier configured to identify a support capability of the responder for the TDLS function;

a fourth address identifier configured to identify an MAC address of a multi-link device of the responder;

a second link identifier configured to identify a link for establishing the TDLS; or a second link address identifier configured to identify an MAC address of a link for establishing the TDLS.

12. The electronic device of claim 9, wherein the third address identifier is the same as the first address identifier.

13. An electronic device comprising a memory, a processor and a computer program stored in the memory and executable on the processor, wherein the computer program, when executed by the processor, implements the method according to claim 5.

* * * * *